US009097364B2

(12) United States Patent
Lovell

(10) Patent No.: US 9,097,364 B2
(45) Date of Patent: Aug. 4, 2015

(54) FLOW STRAIGHTENING SEAT RING AND CONTROL VALVE HAVING FLOW STRAIGHTENING SEAT RING

(75) Inventor: Michel K. Lovell, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 288 days.

(21) Appl. No.: 13/431,697

(22) Filed: Mar. 27, 2012

(65) Prior Publication Data
US 2013/0256572 A1 Oct. 3, 2013

(51) Int. Cl.
*F16K 47/08* (2006.01)

(52) U.S. Cl.
CPC ............ *F16K 47/08* (2013.01); *Y10T 29/49407* (2013.01); *Y10T 29/49416* (2013.01)

(58) Field of Classification Search
CPC ... F16K 47/08; F16K 47/14; Y10T 29/49407; Y10T 29/49409; Y10T 29/49416
USPC ............... 137/601.18, 625.3, 625.37, 625.38, 137/599.01; 251/117, 118, 123, 127, 324, 251/325, 366; 138/44; 239/590.3; 52/668
See application file for complete search history.

(56) References Cited

U.S. PATENT DOCUMENTS

| 2,335,181 | A | * | 11/1943 | Heath | 219/58 |
| 2,384,303 | A | * | 9/1945 | Heath | 52/668 |
| 2,685,426 | A | * | 8/1954 | MacGregor | 251/118 |
| 2,697,446 | A | * | 12/1954 | Harrington | 137/509 |
| 4,085,774 | A | * | 4/1978 | Baumann | 137/625.3 |
| 5,271,601 | A | * | 12/1993 | Bonzer et al. | 251/61.1 |
| 5,529,093 | A | * | 6/1996 | Gallagher et al. | 138/44 |
| 6,880,579 | B2 | * | 4/2005 | Boger | 138/44 |
| 7,089,963 | B2 | * | 8/2006 | Meheen | 138/44 |
| 7,370,675 | B2 | * | 5/2008 | Cancade et al. | 138/45 |
| 7,845,688 | B2 | * | 12/2010 | Gallagher et al. | 285/412 |
| 8,091,587 | B1 | * | 1/2012 | Schwartz | 138/44 |
| 8,567,149 | B2 | * | 10/2013 | Kuzmin | 52/592.1 |
| 2008/0246277 | A1 | * | 10/2008 | Gallagher et al. | 285/148.13 |
| 2010/0078084 | A1 | * | 4/2010 | Zuck et al. | 137/528 |

(Continued)

FOREIGN PATENT DOCUMENTS

WO WO-95/35458 A1 12/1995

OTHER PUBLICATIONS

"9.5 Airflow Straightners," Air Movement and Control Association, pp. 46, 1990.
International Search Report and Written Opinion for Application No. PCT/US2013/033053, dated Jun. 19, 2013.

(Continued)

*Primary Examiner* — Matthew W Jellett
(74) *Attorney, Agent, or Firm* — Marshall, Gerstein & Borun LLP

(57) ABSTRACT

A seat ring for a control valve has a valve body defining an inlet, an outlet, and a gallery. The seat ring includes an annular body and a flow separator. The annular body is adapted to he disposed in the gallery of the valve body and includes an interior sidewall defining a port for accommodating fluid flow through the gallery. The flow separator is disposed within the port and includes a flow straightening portion defining a plurality of separate passageways. Each of the plurality of separate passageways has a hydraulic diameter and a length that is larger than the hydraulic diameter. As such, the passageways separate the flow of fluid through the port into a plurality of separate flow paths to interrupt turbulence adjacent to the port.

45 Claims, 10 Drawing Sheets

(56) References Cited

U.S. PATENT DOCUMENTS

2010/0117020 A1* 5/2010 Greif .............................. 251/367
2010/0326533 A1 12/2010 Mooney et al.
2011/0073792 A1 3/2011 Allen
2011/0140029 A1* 6/2011 Greif .............................. 251/367

OTHER PUBLICATIONS

International Search Report and Written Opinion for Application No. PCT/US2013/033053, dated Oct. 1, 2014.

* cited by examiner

FLOW STRAIGHTENING SEAT RING AND CONTROL VALVE HAVING FLOW STRAIGHTENING SEAT RING

FIELD OF THE DISCLOSURE

The present disclosure is directed fluid flow control devices and, more particularly, to seat rings for fluid flow control devices.

BACKGROUND

Fluid flow control devices, such as a control valves, are commonly used to control characteristics of a fluid flowing through a pipe. A typical device includes a valve body defining an inlet, an outlet, and a fluid flow path extending between the inlet and the outlet. A valve seat ring is coupled to the valve body and defines an orifice through which the flow path travels. A throttling element, such as a plug, is moveable relative to the valve seat ring to control fluid flow through the orifice.

When selecting a control valve for a particular process, a control valve engineer may be faced with many design requirements and design constraints. For example, some piping applications require piping connections to be axially aligned where other applications may permit piping connections to be at right angles relative to the inlet and outlet of the valve. Still other applications may have constraints on the face-to-face dimensions (i.e. the distance between the inlet and outlet of the control valve).

One common style of control valve is a globe valve. More particularly, a top-entry globe valve may be commonly used due to its ease of maintenance and application versatility. These types of valves can be used in critical applications, such as severe service applications, where radiated noise and turbulent flow may be an issue. Such top-entry access to the internal components provides quick changes and maintenance that eliminates costly downtime in the process plant. Top-entry globe valves include non-axial flow paths; otherwise known as tortuous, flow paths. Such non-axial flow paths can create turbulence in the flow path of the control valve, which can detrimentally impact the performance of the system and lead to operational inefficiencies and increased operational costs and downtime.

SUMMARY

One aspect or the present disclosure provides a seat ring for a control valve having valve body defining an inlet, an outlet, a gallery, and a flow passage extending from the inlet the outlet via the gallery. The seat ring includes an annular body and a flow separator. The annular body is adapted to be disposed in the gallery or the valve body and includes a retaining portion and an interior sidewall. The retaining portion is for being fixed to the valve body. The interior sidewall defines a port for accommodating fluid flow through the gallery via the seat ring. The flow separator is disposed within at least a portion or the port or the annular body and includes a flow straightening portion defining a plurality or separate passageways. Each of the plurality of separate passageways has a length and a hydraulic diameter wherein the length is large than the hydraulic diameter to form separate passageways that segregate the flow of fluid through the port into a plurality or separate flow paths to interrupt turbulence in the gallery.

Another aspect of the present disclosure provides a fluid flow control device including a valve body, a control element, and a seat ring. The valve body defines an inlet orifice, an outlet orifice, and a gallery disposed between the inlet orifice and the outlet orifice. The inlet and the outlet orifices extend along a common first axis, while the gallery extends along a second axis that is transverse to the first axis. The control member is disposed within the gallery of the valve body and displaceable along the second axis for controlling the flow of fluid through the valve body. The seat ring is fixedly disposed within the gallery of the valve body and includes an annular body and a flow separator. The annular body includes a retaining portion and an interior sidewall. The retaining portion is fixedly attached to the valve body and the interior sidewall defines a port for accommodating fluid flow through the gallery. The flow separator is disposed within at least a portion of the port of the annular body and includes a flow straightening portion defining a plurality or separate passageways. Each of the plurality of separate passageways has a length and a hydraulic diameter wherein the length is larger than the hydraulic form separate passageways that segregate the flow of fluid through the port a plurality of separate flow paths to interrupt turbulence in the gallery.

Another aspect of the present disclosure provides a fluid flow control device including a valve body, a control member, and a seat ring. The valve body defines an inlet orifice, an outlet orifice, and a gallery disposed between inlet orifice and the outlet orifice. The inlet and the orifices extend along a common first axis, while the gallery extends along a second axis that is transverse to the first axis. The control member is disposed within the gallery of the valve body and displaceable along the second axis for controlling the flow of fluid through the valve body. The seat ring is fixedly disposed within the gallery of the valve body and includes an annular body and a means for reducing pressure fluctuations. The annular body includes a retaining portion and an interior sidewall. The retaining portion is fixedly attached to the valve body and the interior sidewall defines a port for accommodating fluid flow through the gallery. The means for reducing pressure fluctuations is fixed within the port of the annular body for reducing fluctuations in an inlet pressure at the inlet orifice of the valve body and an outlet pressure at the outlet orifice, and subsequently the differential pressure or $\Delta p$, of the valve body.

Another aspect of the present disclosure provides a fluid flow control device including a valve body, a control element, and a seat ring. The valve body defines an inlet orifice, an outlet orifice, and a gallery disposed between the inlet orifice and the outlet orifice. The inlet and the outlet orifices extend along a common first axis, while the gallery extends along a second axis that is transverse the first axis. The control member is disposed within the gallery of the valve body and displaceable along the second axis for controlling the flow of fluid through the valve body. The seat ring is fixedly disposed within the gallery of the valve body and includes an annular body and a means for reducing force fluctuations. The annular body includes a retaining portion and an interior sidewall. The retaining portion is fixedly attached to the valve body and the interior sidewall defines a port for accommodating fluid flow through the gallery. The means for reducing force fluctuations is fixed within the port of the annular body for reducing fluctuations in a fluid force applied to the control element.

Another aspect of the present disclosure provides a method of manufacturing a seat ring including an annular body and a flow separator. The method includes cutting a first plurality of flat pieces of a material into a first plurality of elongated slats having a first plurality of slits extending downward from an upper edge thereof. The method additionally includes cutting a second plurality of flat pieces of a material into a second plurality of elongated slats having a second plurality of slits extending upward from a bottom edge thereof. The method additionally includes interconnecting the first plurality of elongated slats with the second plurality of elongated slats by aligning each of the first plurality of slits with a corresponding one of the second plurality of slits and sliding the slats together such that portions of the first plurality of slats are received within the second plurality of slits of the second plurality of elongated slats and portions of the second plurality or slats are received within the first plurality of slits of the first plurality of elongated slats. Further still, the method includes fixing the first and second pluralities of slats together at locations adjacent to at least some of the first and second pluralities of slits to create an intermediate flow separator. Further yet, the method includes working the intermediate flow separator into a desired shape to correspond with a cross-sectional shape of a port or a corresponding annular body of a seat ring to create a final flow separator. The method further includes inserting the final flow separator into the port of the annular body and fixing the final flow separate the annular body.

Yet another aspect of the present disclosure provides a method of retro-fitting a fluid flow control device with a flow separator, wherein the fluid flow control device includes a valve body, a control element, and a seat ring, the valve body defining an inlet, an outlet, and a gallery disposed between the inlet and the outlet, the control element movably disposed in the gallery between a closed position and at least one open position, and the seat ring fixed in the gallery for being sealingly engaged by the control element when the control element is in the closed position. The method includes removing the control element from the gallery of the valve body, thereby exposing a gallery opening in the valve body. The method further includes removing the seat ring from the valve body, the seat ring comprising an annular body including an interior sidewall defining a port for accommodating fluid flow through the gallery. The method further includes positioning a flow separator into the port of the seat ring, the flow separator including a flow straightening portion and at least one foot portion, the flow straightening portion defining a plurality of separate passageways, the at least one foot portion extending radially outward from the flow straightening portion. Still further, the method includes fixing the at least one foot portion to an axial end surface of the annular body, thereby fixing the flow separator to the annular body. Further yet, the method includes inserting and securing the seat ring, including the annular body and the flow separator, in the gallery of the valve body such that the plurality of separate passageways are adapted to separate the flow of fluid through the port into a plurality of separate flow paths.

DETAILED DESCRIPTION OF THE FIGURES

As will be described in detail, the present disclosure is directed to a flow straightening seat ring and a control valve having a flow straightening seat ring, as well as methods of manufacturing and installing such a seat ring into a control valve. The seat ring generally includes an annular body and a flow separator disposed in the opening of the annular body (i.e., port). The flow separator includes a plurality of separate passageways for separating (a.k.a., dividing) the flow of fluid through the seat ring into a plurality of non-communicating flow paths that can be approximately 3-6 times longer, in one example, than the hydraulic diameter of the separate flow passageways. The separate flow paths thereby disrupt turbulence at that point in the valve body and promote uniform flow to increase the operational efficiency of the system, which is particularly advantageous for valve bodies that are in a "flow up" configuration.

Figure 1:
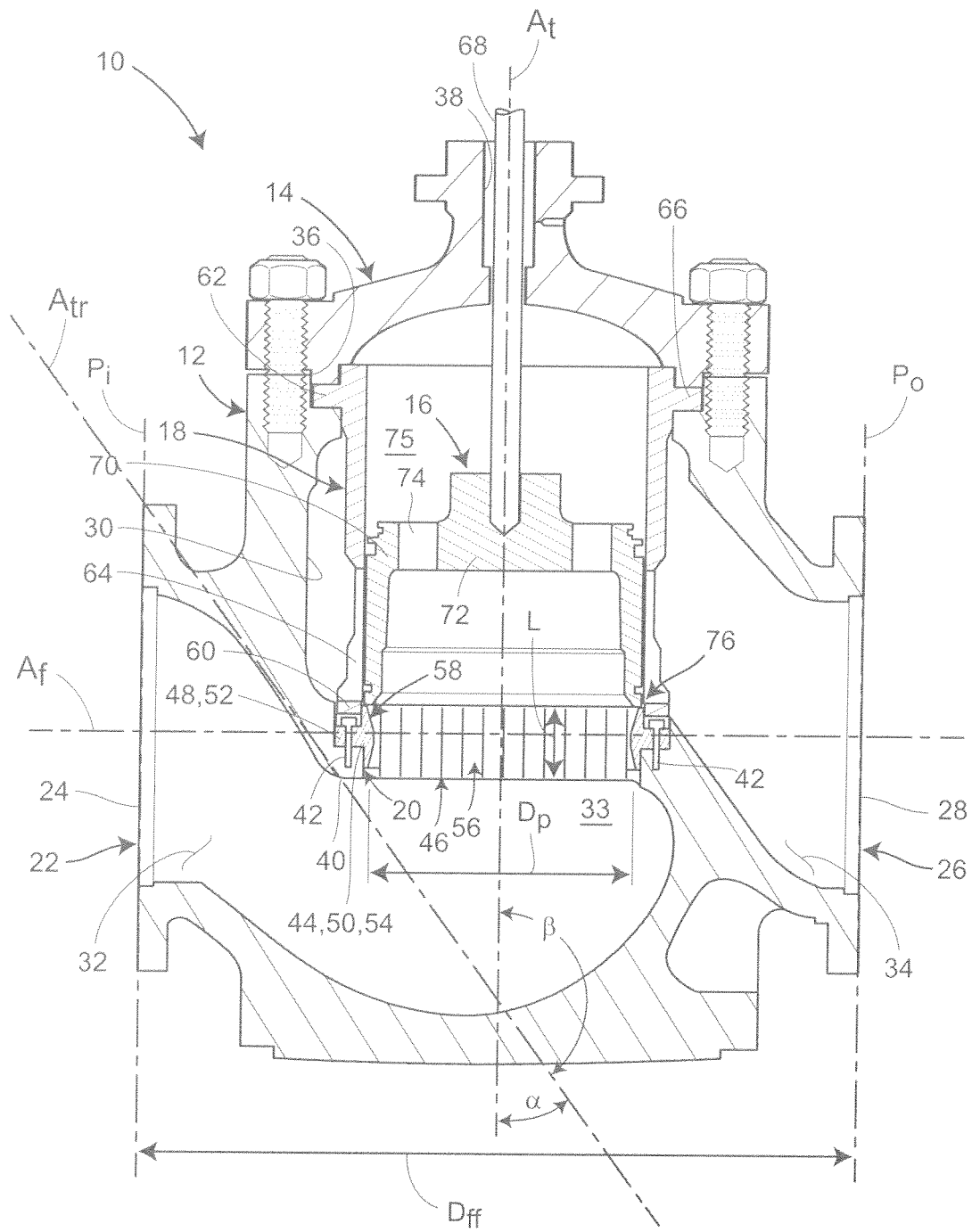
FIG. 1 is a cross-sectional side view of a fluid flow control device constructed in accordance with the principles of the present disclosure.

FIG. 1 depicts a fluid flow control device (i.e., a control valve) 10 constructed in accordance with the principles of the present disclosure. In the present example, the control device 10 includes a globe-style valve including a valve body 12, a bonnet 14, a control member 16, a cage 18, and a seat ring 20.

The valve body 12 includes a flow passage formed by an inlet 22 including an inlet orifice 24, an outlet 26 including by an outlet orifice 28, and a gallery 30 disposed between the inlet and outlet orifices 24, 28. The gallery 30 comprises a generally cylindrical bore extending generally vertically the valve body 12 along a gallery axis At and defining a gallery opening 36 in the valve body 12. In addition to the inlet orifice 24, the inlet 22 includes an inlet passage 32 that extends between the inlet orifice 24 and the gallery 30. Similarly, in addition to the outlet orifice 28, the outlet 26 includes an outlet passage 34 that extends between the outlet orifice 28 and the gallery 30.

In the depicted example, the inlet orifice 24 and the outlet orifice 28 of the valve body 12 are centered along a common flow axis Af. The common flow axis Af is transverse to the inlet passage axis Atr and, in the depicted example, the flow axis Af is approximately perpendicular to the gallery axis At. Further still, the inlet orifice 24 occupies a generally vertical inlet plane Pi and the outlet orifice occupies a generally vertical outlet plane Po that is parallel to and offset from the inlet plane Pi by a face-to-face dimension Dff. In the configuration described above and depicted in FIG. 1, the control valve 10 is arranged in a "flow up" configuration. That is, as fluid flows in the inlet 22, it passes through the inlet passage 32 and must "flow up" towards the gallery 30. When the control member 16 is positioned off the seat ring 20, the fluid flows from the inlet passage 32 and must turn sharply to flow through the seat ring 20 and to the gallery 30. In the example depicted, at least a portion of the inlet passage 32 that is positioned immediately adjacent to the gallery 30 extends along a transition axis Atr that is disposed at an angle. alpha. relative to the gallery axis At. In some examples, the angle α can be in a range of approximately 30 degrees to approximately 90 degrees, in a range of approximately 45 degrees to approximately 90 degrees, or in some other range. In the example depicted in FIG. 1, the angle α is approximately 45 degrees. So configured, fluid flowing into the gallery 30 from the inlet passage 32 of the valve body 12 must make a turn at an angle β that is equal to the supplement of angle α or 135 degrees. In other examples, the fluid could make a turn at an angle β that is in a range of approximately 90 degrees to approximately 150 degrees, for example, or some other angle.

Still referring to FIG. 1, the seat ring 20 of the present embodiment of the control device 10 includes a ring-shaped member fixed within an inner webbed portion 40 of the gallery 30 of the valve body 12. In some examples, the seat ring 20 can be threaded into the webbed portion 40, retained by a weld, or, as depicted in FIG. 1, the seat ring 20 can be retained by one or more threaded fasteners 42 in cooperation with being positioned between the cage 18 and the webbed portion 40. Regardless of the means by which the seat ring 20 is retained within the valve body 12, the disclosed example of the seat ring 20 includes an annular body 44 and a flow separator 46. The annular body 44 includes a generally solid ring-shaped member including a retaining portion 48 and a seating portion 50. The retaining portion 48 includes a shoulder 52 extending radially outward from the seating portion 50 and, in the disclosed embodiment, receives the threaded fasteners 42 for securing the seat ring 20 into the gallery 30. The seating portion 50 of the disclosed example includes an interior sidewall 54. In the example shown in FIG. 1, the interior sidewall 54 is contoured convexly inwardly to define an upper seating surface 58 and defines a circular port 56 in the seat ring 20. The port 56 includes a port diameter Dp.

Still referring to FIG. 1, the cage 18 of the control device 10 of the present example includes a hollow cylindrical member with a bottom end 60, a top end 62, and a plurality of windows 64. The cage 18 is disposed in the gallery 30 of the valve body 12 such that the bottom end 60 abuttingly engages the shoulder 52 of the retaining portion 48 of the seat ring 20 to assist with maintaining the seat ring 20 in connection with the webbed portion 40 of the gallery 30. The top end 62 includes a radially outwardly extending flange 66 sandwiched between the bonnet 14 and the valve body 12 adjacent to the gallery opening 36. The windows 64 provide a route for fluid to flow between the inlet 22 and the gallery 30 when the control member 16 occupies a position to allow such flow.

The control member 16, as shown, includes a stem 68 and a valve plug 70 fixed to an end of the stem 68. The valve plug 70 includes a cylindrical body with an end wall 72 fixed to the stem 68. The end wall 72 additionally includes a plurality of openings 74 for enabling communication of fluid from the inlet passage 32 to a bonnet chamber 75 which enables balanced operation of the control device 10. So configured, the control member 16 is movable within the gallery 30 between a closed position, wherein a seating end 76 of the valve plug 70 sealingly engages the seating surface 58 of the interior sidewall 54 of the seat ring 20 (shown in FIG. 1) to prevent the flow of fluid through the gallery 30, and an open position, wherein the seating end 76 of the valve plug 70 is lifted from (e.g., spaced away from) the seat ring 20 to enable the flow of fluid through the gallery 30.

Finally, as mentioned, the control device 10 of the present example includes the bonnet 14, which can be a cap-like structure fixed to the valve body 12 adjacent to the gallery opening 36. In addition to clamping the flange 66 of the cage 18 to retain the cage 18 in the gallery 30, the bonnet 14 includes a through-bore 38 accommodating the stem 68 of the control member 16 such that the stem 68 can extend out to an actuator (not shown) for controlling the position of the control member 16 and the operation of the device 10.

As mentioned above, the seat ring 20 of the present disclosure includes the annular body 44 and the flow separator 46. The annular body 44 primarily serves to establish a flow control region within the valve body 12 by providing a seating surface 58 against which the valve plug 70 seats when occupying the closed position. The flow separator 46 serves to disrupt turbulence or recirculation flow which may form in a recirculation zone 33 adjacent the seat ring 20 and promote uniform fluid flow in the gallery 30 of the valve body 12 during high velocity fluid flow.

Figure 2:
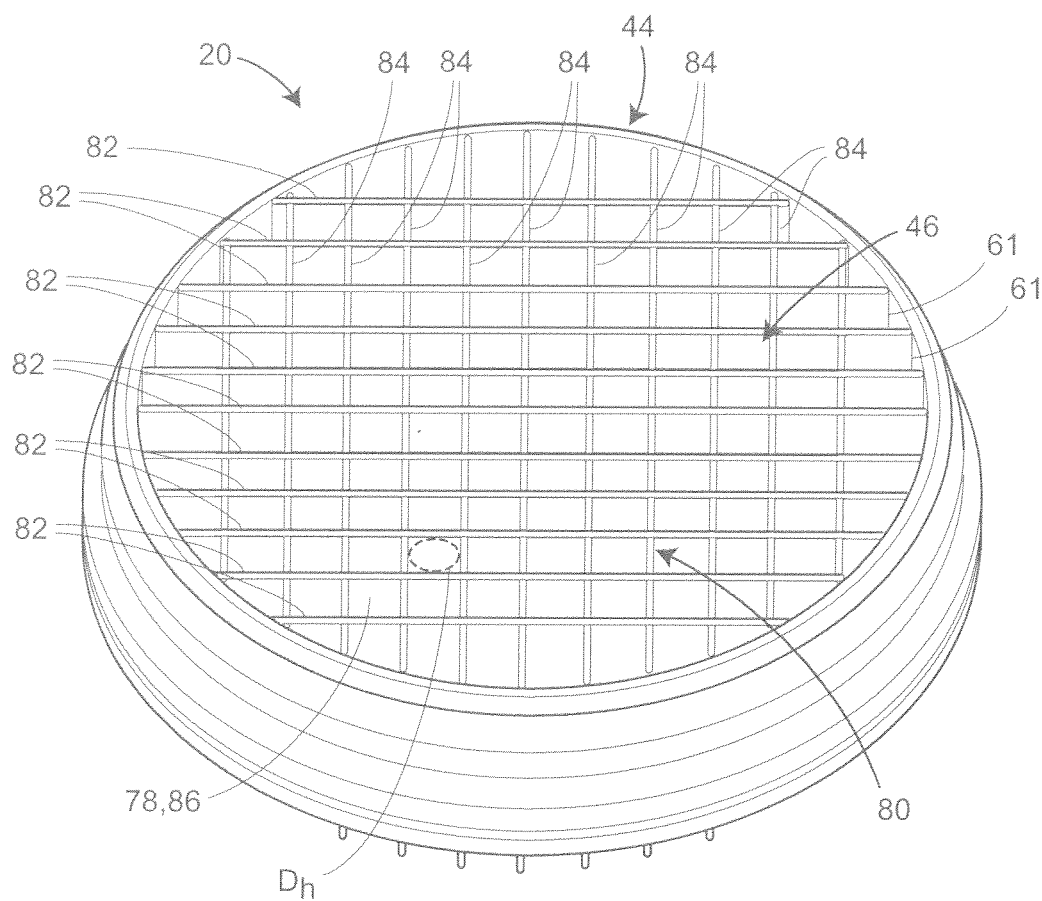
FIG. 2 is a perspective view from the top of one example of a seat ring constructed in accordance with the principles of the present disclosure.

Referring now to FIG. 2, the seat ring 20 of FIG. 1 is illustrated in more detail including the annular body 44 and one example of the flow separator 46. The annular body 44 was described above and therefore its details will not be repeated. The flow separator 46 includes a structure intended to separate the flow of fluid through the seat ring 20 into a plurality of parallel flow paths 78, only one of which is identified by reference numeral for the sake or clarity. This separation of the fluid flow into a plurality or flow paths 78 disrupts a recirculation flow and other turbulence in the recirculation zone 33 of the inlet passage 32 of the valve body 12 that is occupied by the seat ring 20. In some examples, the seat ring 20 can be constructed of a metal material such as a stainless steel alloy including, for example, S31600 or S17400. Other examples can include more corrosive resistant alloys such as, for example, N06625 or N10276. Of course other materials could also be used depending on the particular application involved.

In FIG. 2, the plurality of flow paths 78 are defined by a flow straightening portion 80 of the flow separator 46, which includes first and second pluralities of elongated slats 82, 84 running perpendicular to each other and interconnected to cross-sectionally form a grid-type pattern such that the flow paths 78 occupy a three-dimensional matrix configuration. The first plurality of slats 82 extend parallel to each other and right to left relative to the orientation of FIG. 2 and the second plurality of slats 84 extend parallel to each other and top to bottom relative to the orientation of FIG. 2. So configured, the elongated slats 82, 84 define a plurality of parallel and straight passageways 86, the interior volumes of which correspond to the plurality of fluid flow paths 78. In this example, the plurality of passageways 86 and, as such, the plurality of flow paths 78 have common cross-sectional dimensions and are uniformly distributed across the entirety of the flow straightening portion 80 and the port 56 defined by the annular body 44. In other examples, however, the plurality of passageways 86 and the plurality of flow paths 78 can be distributed in a non-uniform manner and/or can have varying cross-sectional dimensions. Additionally, in the disclosed example, each of the first and second pluralities of slats 82, 84 includes eleven (11) slats 82, 84. This is merely one example, however, and as will be discussed below, the number of slats 82, 84 can be determined as a function of the desired number of passageways 86 and flow paths 78, which can be determined as a function of the desired performance of the flow separator 46.

Figure 3:
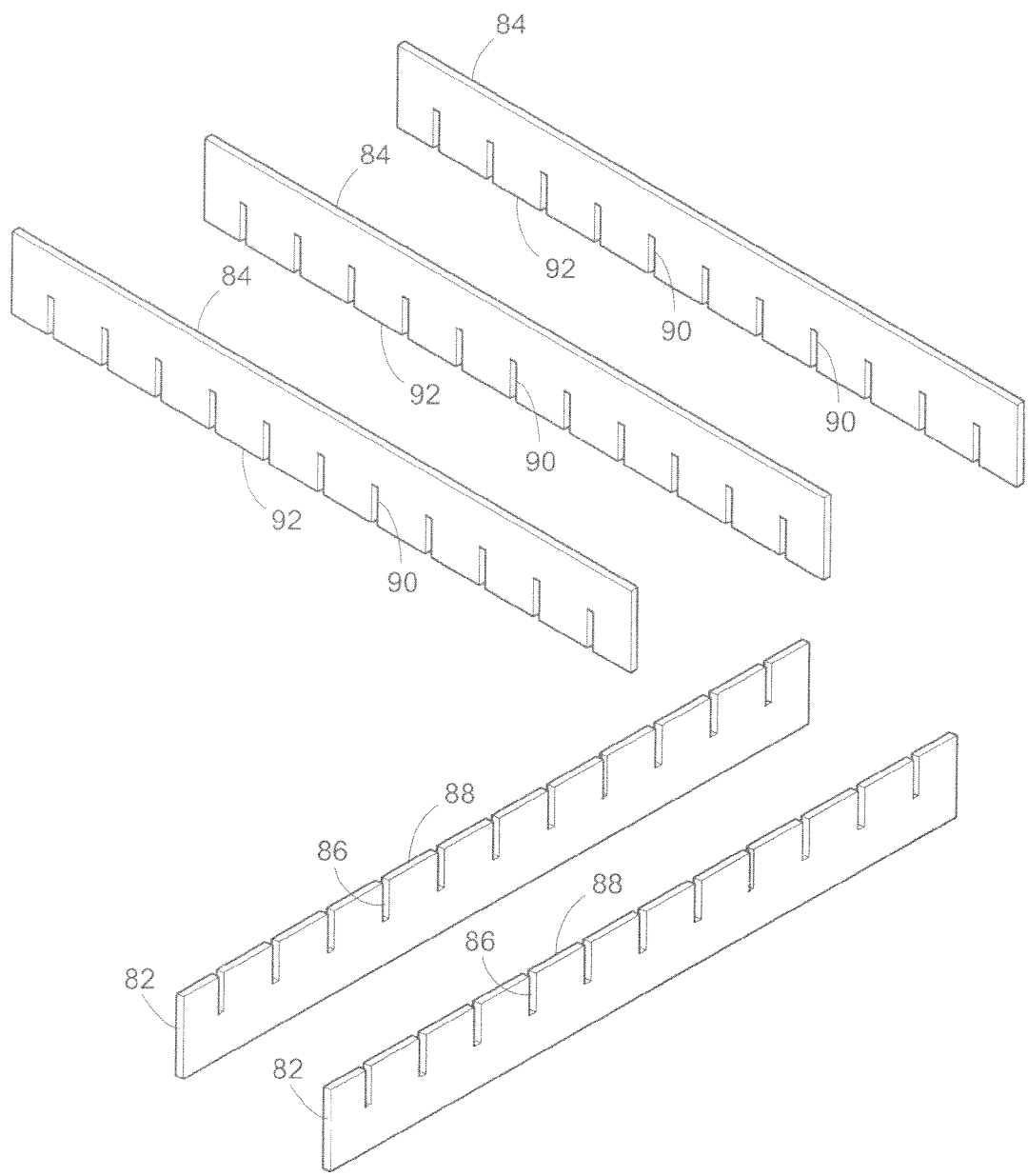
FIG. 3 is a perspective view of a portion of a plurality of slats that combine to make the seat ring of FIG. 2.

Referring now to FIG. 3, which depicts only a select number of the pluralities of slats 82, 84 of FIG. 2, it can be seen that each slat 82, 84 can be constructed from a flat piece of material cut to the desired shape. In the present example, the desired shape is rectangular. For the sake of description, each slat 82 of the first plurality of slats 82 can be referred to as a "bottom slat 82" and includes a first plurality of slits 86 (e.g., slots, cuts, channels, etc.) extending inward (a.k.a., downward) from a top edge 88 of the slat 82. For the sake of description, each slat 84 of the second plurality of slats 84 can be referred to as a "top slat 84" and includes a second plurality of slits 90 (e.g., slots, cuts, channels, etc.) extending inward (a.k.a upward) from a bottom edge 92 of the slat 84. So designed, one slit 90 of each of the top slats 84 is aligned with one slit 86 of a corresponding bottom slat 82 and then the two slats 82, 84 are slid together and interconnected. The process is repeated until all of the slats 82, 84 are interconnected together. At that point, to achieve structural integrity, the first and second pluralities of slats 82, 84 can be fixed together by welding or brazing, for example, to create an intermediate flow separator 46. Such welding or brazing preferably creates joints adjacent to each of the slits 86, 90 and can cause the slats 82, 84 to heat up. Upon cooling, the intermediate flow separator 46 can shrink slightly, depending on the specific material used. Thus, in one preferred method of manufacturing the flow separator 46, the intermediate flow separator 46, which results from the above-described manufacturing process, is further cut to the desired circular shape of the port 56 of the annular body 44 only after welding and cooling. This results in a final flow separator 46, as depicted in FIG. 2, which fits snugly within the port 56 of the seat ring 20. Once positioned within the port 56, the final flow separator 46 can be fixed to the annular body 44 by either welding or brazing ends of any number of the slats 82, 84 to the interior sidewall 54 to thereby form joints 61.

Referring back to FIG. 1, one example of the fluid control device 10 of the present disclosure can include a Class 300, 12 inch valve such as the Fisher Design EU valve, which is commercially available from Fisher Controls International LLC of Marshalltown, Iowa. The inlet and outlet orifices 24, 26 of such a valve can have 12 inch nominal diameters for being connected into a 12 inch pipeline, for example. Additionally, the control device 10 of FIG. 1 can include a face-to-face dimension Dff of approximately 30 inches and a port diameter Dp of approximately 11 inches. These dimensions result in a ratio of face-to-face dimension Dff to port diameter Dp (L/D ratio) of approximately 2.72. Additionally, in one example of the control device 10 that includes the seat ring 20 and flow separator 46 depicted in FIG. 2, each of the flow passageways 86 of the flow separator 46 can have a hydraulic diameter Dh (FIG. 2) and a length L (FIG. 1) that is larger than the hydraulic diameter Dh. In one example, the hydraulic diameter Dh can be approximately 1 inch and the length L can be approximately 4.75 inches. Thus, a L/D ratio for the flow passageways 86 of the present example can be approximately 4.75.

The foregoing dimensions for the control device 10 are merely examples and other control devices 10 constructed in accordance with the principles of the present disclosure could be constructed with different dimensions and within different ratios of dimensions. For example, in one example, a ratio between the length L of the passageways 86 and the hydraulic diameters Dh of the passageways 86 to can be in a range from approximately 1.16 to approximately 10. In other examples, ratio between the length L of the passageways 86 and the hydraulic diameters Dh of the passageways 86 in the flow separator 46 can be in a range of approximately 3 to approximately 6. Furthermore, in some examples, the hydraulic diameter Dh of the passageways 86 in the flow separator 46 can be in a range from approximately ½ inch to approximately 2 inches and the length L of each of the separate passageways 86 in the flow separator 46 can be in a range of approximately 3 inches to approximately 6 inches. Further yet, in some examples, a ratio of the face-to-face dimension Dff to the port diameter Dp of the seat ring 20 of the valve body 12 can be in a range of approximately 1.43 to approximately 10. In some examples, a ratio of the face-to-face dimension Dff to the port diameter Dp of the seat ring 20 of the valve body 12 can be in a range of approximately 2.5 to approximately 3. Thus, from the foregoing, it should be appreciated that any combination of parameters (e.g., port diameter Dp, face-to-face dimension Dff, angle α, etc.) described herein can be combined within a control device 10 including a flow separator 46 according to the principles of the present disclosure. Moreover, the disclosure is not limited to incorporating a flow separator 46 into the specific control devices 10 described, but rather, any control device capable of benefitting from the incorporation of such a flow separator is included. Furthermore, while the foregoing dimensions are provided with respect to the features disclosed specifically in FIGS. 1 and 2, the same dimensions and dimensional relationships can apply equally to all subsequent alternative examples and features.

Figure 4:
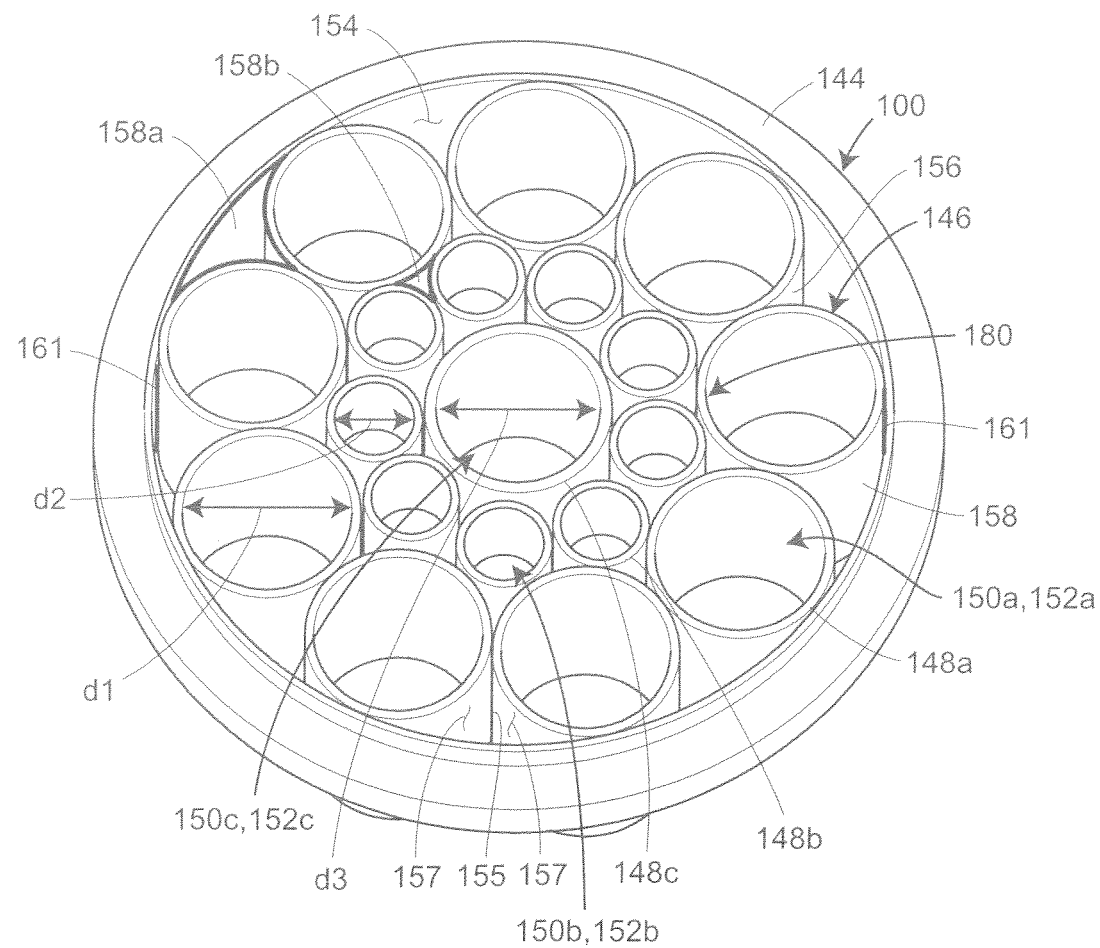
FIG. 4 is a perspective view of another example of a seat ring constructed in accordance with the principles of the present disclosure.

While the flow separator 46 depicted in FIG. 2 has been described as including the first and second pluralities of slats 82, 84 interconnected together to define the separate passageways 86 and flow paths 78, this is merely one example, and alternative flow separators may be constructed differently. For example, FIG. 4 depicts an alternative seat ring 100 including an annular body 144 and a flow separator 146 constructed in accordance with the principles of the present disclosure. The details of the annular body 144 in FIG. 4 can be identical to the annular body 44 described above and therefore will not be repeated. The flow separator 146 of FIG. 4 includes a flow straightening portion 180 including a plurality of parallel tubes 148 fixed in a bundle by welding, brazing, or some other means. The plurality of tubes 148 include an outer ring of tubes 148a, an inner ring of tubes 148b, and a central tube 148c. The welding or brazing preferably forms joints 155 between adjacent exterior sidewalls 156 of the tubes 148a, 148b, 148c, as shown. Additionally, similar to the flow separator 46 described above, the flow separator 146 of FIG. 4 can be fixed to an interior sidewall 154 of the annular body 144 of the seat ring 100 by a plurality of joints 161 formed by welding, brazing, or some other means, to ensure that the entirety of the seat ring 100 including the flow separator 146 is structurally stable.

Each of the tubes 148a, 148b, 148c in FIG. 4 comprises one of a plurality of separate passageways 150a, 150b, 150c that defines an interior volume acting as a primary fluid flow path 152. In the depicted example, the tubes 148a, 148b, 148c are hollow cylindrical tubes having circular cross-sections. As such, due to the geometry of the particular tubes 148a, 148b, 148c the flow separator 146 of the present example also defines a plurality of secondary fluid flow paths 158. The secondary flow paths 158a, 158b are located between exterior sidewalls 157 of adjacent tubes 148a, 148b, 148c as well as between the exterior sidewalls 157 of the outer ring of tubes 148a and the interior sidewall 154 of the annular body 144. In this example, the secondary flow paths 158 include perimeter paths 158a and interior paths 158b, one of each shown with thickened lines in FIG. 4. The perimeter paths 158a are disposed between the outer ring of tubes 148a and the annular body 144 and are triangular in cross-section, having two inwardly curved sides and one outwardly curved side defined by the interior sidewall 54 of the annular body 44. In contrast, the interior paths 158b are triangular in cross-section with three inwardly curved sidewalls.

Additionally, the tubes 148a, 148b, 148c of the example of FIG. 4 vary in diameter. That is, each of the outer ring of tubes 148a has a first diameter d1, each of the inner ring or tubes 148b has a second diameter d2, and the central tube 148c has a third diameter d3. In the depicted example, d1 is larger than d2 and d3, while d3 is larger than d2. As such, the flow separator 146 in FIG. 4 includes a non-uniform distribution or tubes 148, passageways 150, and flow paths 152 across the entirety of the port 156 of the annular body 144. With this configuration, the flow separator 146 can provide for higher capacity flow through the outer ring of tubes 148a and through the central tube 148c, and a lower capacity flow through the inner ring of tubes 148b. This can be advantageous, for example, for operating in flow paths that have a pattern of distortion or turbulence that is higher in the region occupied by the inner ring of tubes 148b, relative to the regions occupied by the outer ring of tubes 148a and the central tube 148c. This is one example of a non-uniform distribution and the diameters of the various flow paths and passageways can be varied, as desired. As such, it should be appreciated that the non-uniform distribution of passageways and flow paths of this example illustrate that the subject matter or the present application can be customized (e.g., tuned) to best suit a particular turbulence profile, if desired.

Each of the seat rings 20, 100 thus far disclosed has been described as including a flow separator 46, 146 that is fixed to the interior sidewall 54, 154 of the annular body 44, 144. This is practical for manufacturing and assembly operations that occur at the factory. It may, however, be desirable to install a flow separator into a seat ring of a control valve operating in the field.

Figure 5:
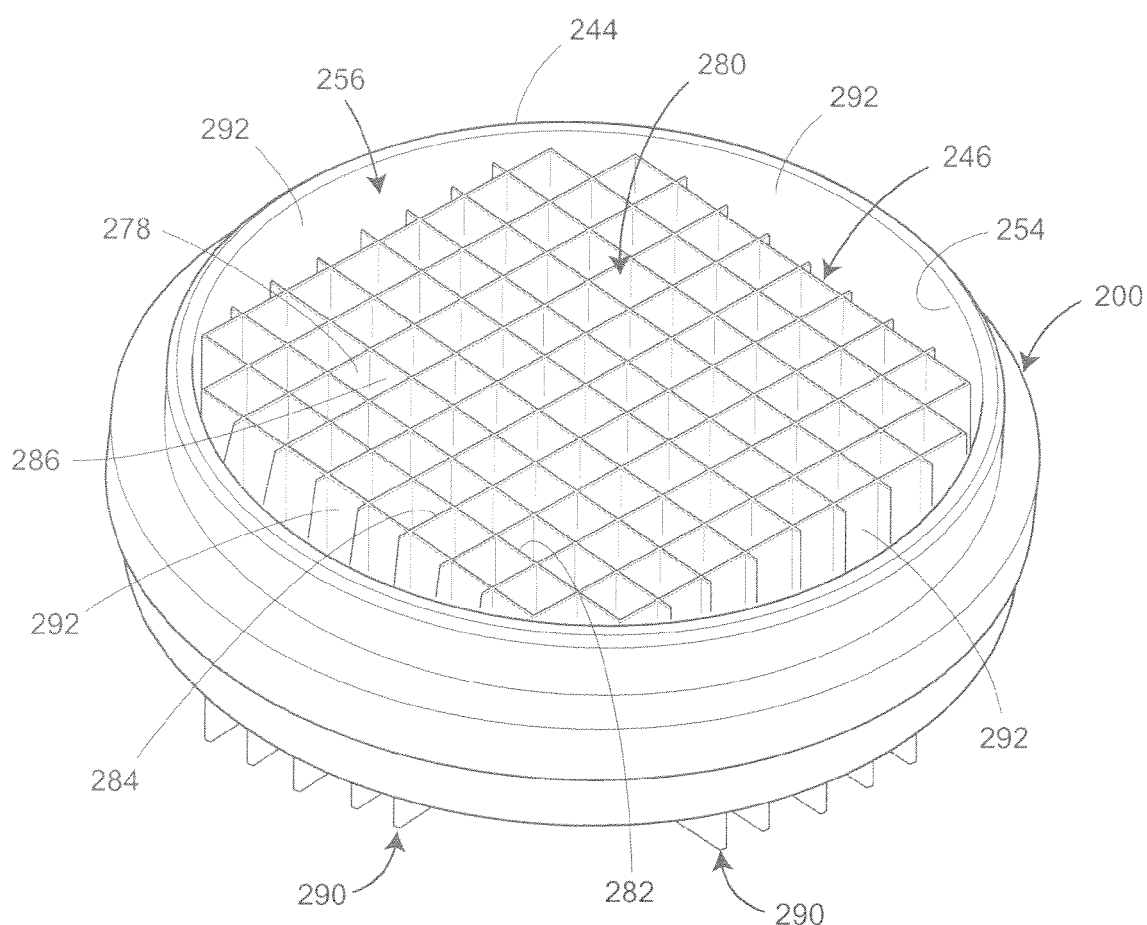
FIG. 5 is a perspective view from the top of yet another example of a seat ring constructed in accordance with the principles of the present disclosure.
Figure 6:
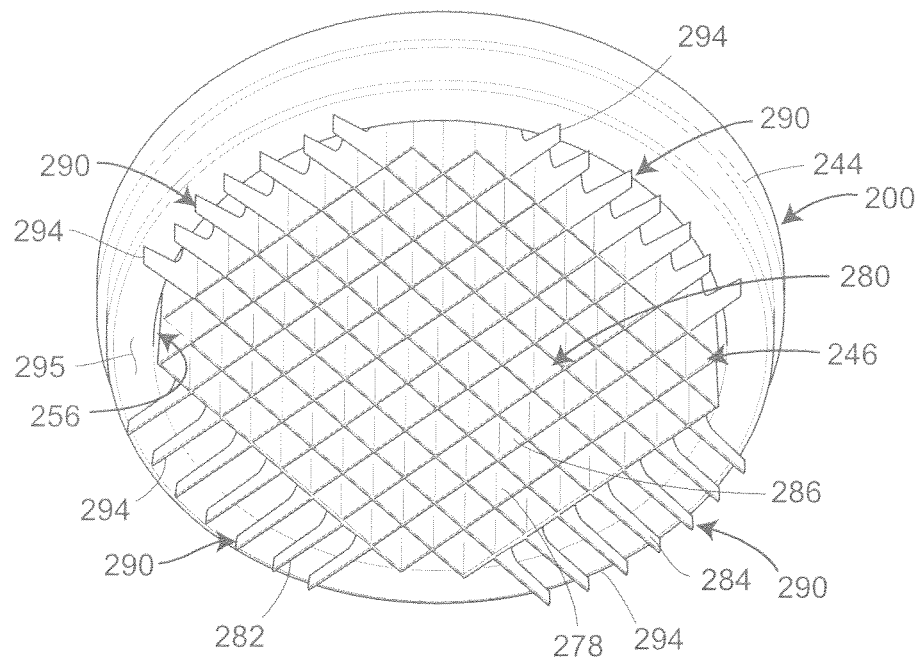
FIG. 6 is a perspective view from the bottom of the seat ring of FIG. 5.

FIGS. 5 and 6 depict one example of a seat ring 200 including an annular body 244 defining a fluid port 256 and a flow separator 246 (also separately shown in FIG. 7) for facilitating such field installation. The flow separator 246 can be constructed generally similar to the flow separator 46 described above with reference to FIGS. 2 and 3, for example, with a few exceptions that will be discussed below. That is, the flow separator 246 can include a structure intended to separate the flow of fluid through the seat ring 200 into a plurality of parallel flow paths 278, only one of which is identified by reference numeral for the sake of clarity. This separation of the fluid flow into a plurality of flow paths 278 disrupts distortion and other turbulence in the valve body.

Figure 7:
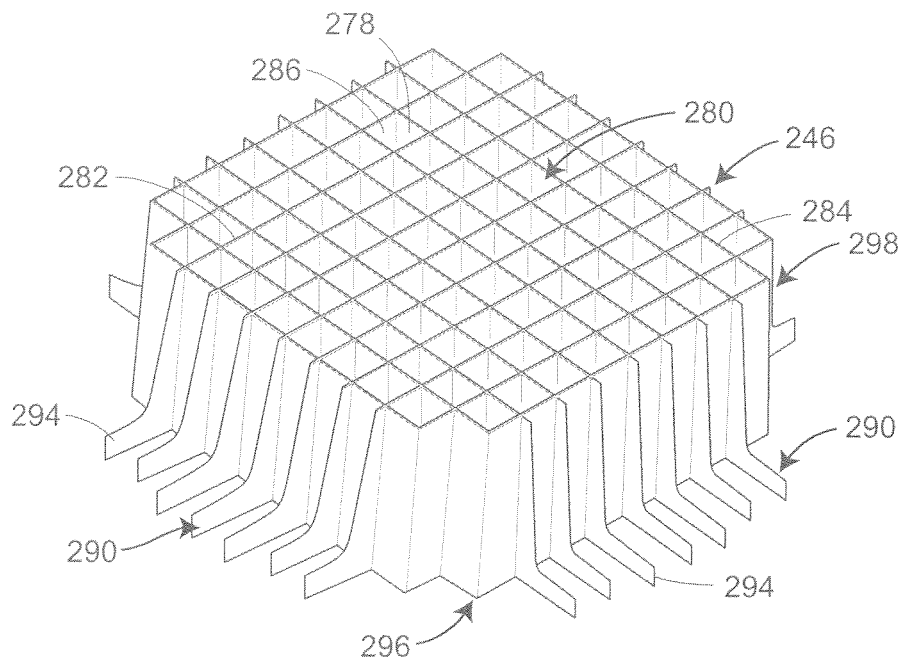
FIG. 7 is a perspective view a flow separator of the seat ring of FIGS. 5 and 6.

In FIGS. 5-7, the plurality of flow paths 278 are defined by a flow straightening portion 280 of the flow separator 246, which includes first and second pluralities of elongated slats 282, 284 running perpendicular to each other and interconnected to form a grid type pattern in a manner generally identical to that described above with reference to FIGS. 2 and 3. So configured, the elongated slats 282, 284 define a plurality a separate passageways 286, the interior volumes of which correspond to the plurality of fluid flow paths 278 arranged in a three-dimensional matrix configuration. In this example, the plurality of passageways 286 and, as such, the plurality of flow paths 278 have common cross-sectional dimensions and are generally uniformly distributed across the entirety of the flow straightening portion 280 of the flow separator 246. In other examples, however, the plurality of passageways 286 and the plurality of flow paths 278 can have varying cross-sectional dimensions and/or can be distributed in a non-uniform manner and can have varying cross-sectional dimensions.

One distinction relative to the flow separator 46 described above in FIGS. 2-3, is that the flow straightening portion 280 of the flow separator 246 depicted in FIGS. 5-7 includes a generally square cross-section, when viewed from above, for example, as can be seen in FIG. 7. The flow separator 46 described above in FIGS. 2-3 has a generally circular cross-section, when viewed from above. The square cross-section may be desirable for field installation because of generous clearance afforded between an interior sidewall 254 of the annular body 244 and the external dimensions of the flow separator 246. Due to the square cross-section, the plurality of passageways 286 and How paths 278 of the flow separator 246 in FIGS. 5-7 do not completely fill the port 256 of the seat ring 200. That is, as depicted in FIG. 5, for example, the seat ring 200 can include four partial circular areas 292 that are devoid of slats. To some extent, the capacity of the seat ring 200 in these areas 292 can be higher than in the center of the flow separator 246, depending on the flow characteristics the particular application. In other examples, the slats 282, 284 can be designed to extend as completely as possible to the interior sidewall 254 of the annular body 244 to close these areas 292 and define a completely uniform distribution of passageways 286 and flow paths 278 across the entirety of the port 256, in addition to across the entirety of the flow straightening portion 280.

A further distinction relative to the flow separator 46 described with reference to FIGS. 2 and 3, is that the flow separator 246 depicted in FIGS. 5-7 includes a plurality of foot portions 290 extending radially outwardly from the flow straightening portion 280, as can easily he seen in FIG. 7. In this example, each foot portion 290 includes a plurality of flanges 294 extending from opposing ends of each of the plurality of slats 282, 284. That is, in this example, opposing ends of each of the slats 282, 284 are cut to have an L-shaped profile with the lower leg of the L defining the flange 294 disposed proximate to a bottom end 296 of the flow separator 246, which is opposite to a top end 298 of the flow separator 246. Upon assembly, each of the foot portions 290, and optionally each of the flanges 294 of the foot portions 290, is fixedly attached to an axial end surface 295 (FIG. 6) of the annular body 244 of the seat ring 200 by welding, brazing, or some similar means. Optionally, if desired, ends of the slats 282, 294 can also be fixed, by welding, brazing, or otherwise, to the interior sidewall 254 of the annular body 244 of the seat ring 200 in a manner similar to that described above with the seat ring 20 depicted in FIGS. 2 and 3 to provide added structural integrity.

To install the flow separator 246 depicted in FIGS. 5-7 into a seat ring that is resident in a field operating fluid flow control device such as control device 10, depicted in FIG. 1, the bonnet 14 and the control element 16 are first removed from the gallery 30 of the valve body 12. This exposes the gallery opening 36 in the valve body 12. Then, the cage 18 and the seat ring 200 can be removed from the valve body 12 through the gallery opening 36. Optionally, the seat ring 200 can be removed from the cage 18, but it may not be necessary. With the seat ring 200 removed, the flow straightening portion 280 of the flow separator 246 depicted in FIGS. 5-7 can be positioned by insertion into the port 256 defined by the annular body 244. When appropriately positioned, the foot portions 290 contact the axial end surface 295 of the annular body 244. At least one of the flanges 294 of the foot portions 290, and optionally each of the flanges 294 of each of the foot portions 290, can then be fixed to the axial end surface 295 by welding, brazing, or some other means, thereby fixing the flow separator 246 to the annular body 244. The seat ring 200, including the annular body 244 with flow separator 246 installed, can then be inserted through the gallery 30 of the valve body 12, with or separate from the cage 18, and secured back into position. Finally, the control element 18 and the bonnet 14 can be reattached to the valve body 12 and the process is complete. In some examples, prior to inserting the flow straightening portion 200 of the flow separator 246 into the port 256, the cross-sectional shape of the flow straightening portion 280 can be worked (e.g., cut, ground, machined, filed, etc.) to a cross-sectional shape that fits more desirably inside of the port 256.

Figure 8:
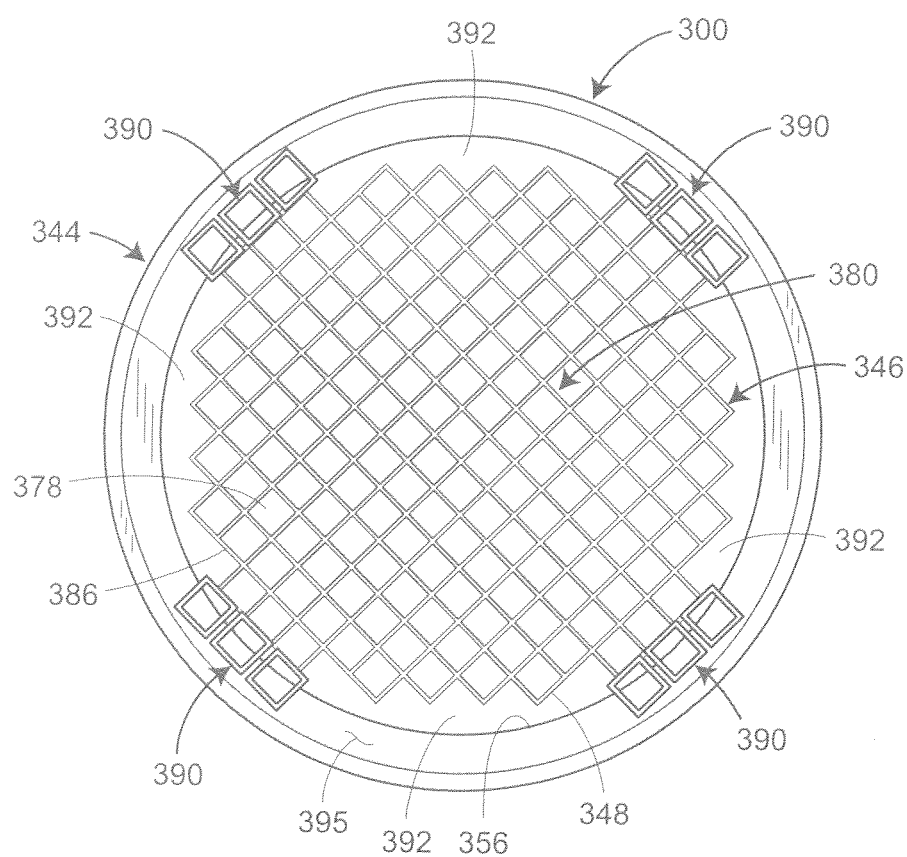
FIG. 8 is a bottom plan view of still another example of a seat ring constructed in accordance with the principles of the present disclosure.

As mentioned, the flow separator 246 depicted in FIGS. 5-7 can be constructed in a manner similar to that described with reference to the flow separator 46 of FIGS. 2 and 3, i.e., including interconnected slats 282, 284. FIG. 8 depicts another example of a seat ring 300 including a flow separator 346 adapted for field installation similar to the flow separator 246 depicted in FIGS. 5-7. The flow separator 346 is similar to the flow separator 246 in that it includes a flow straightening portion 380 and a plurality of foot portions 390 to facilitate field installation, if desired, but it is different in that it is constructed of a plurality of parallel square tubes 348. The foot portions 390 can be fixed to an axial end surface 395 of an annular body 344 of the seat ring 300, similar to the foot portions 290 of the exampled depicted in FIGS. 5-7, by welding, brazing, or some other means. The tubes 348 are fixed together in a bundle by welding, brazing, or some other means, similar to the plurality of tubes 148 described above with reference to FIG. 4.

In FIG. 8, the tubes 348 have a common and generally uniform area and define separate passageways 386 and corresponding flow paths 378 that are generally uniformly distributed across the entirety of the flow separator 346. Similar to the flow separator 246 described with reference to FIGS. 5-7, the flow straightening portion 380 of the separator 346 includes a generally square shape when viewed from above. Therefore, the seat ring 300 depicted in FIG. 8 can include four partial circular areas 392 that are devoid of tubes 348. To some extent, the capacity of the seat ring 300 in these areas 392 can be higher than in the center of the flow separator 346, depending on the flow characteristics of the particular application. In other examples, the cross-sectional dimensions of the tubes 348 however can be sufficiently small to enable the flow separator 346 to occupy a cross-sectional shape that corresponds more closely to the actual cross-sectional shape of the annular body 344 of the seat ring 300. So configured, in some examples, the tubes 348 could define a completely uniform distribution of passageways 386 and flow paths 378 across the entirety of the port 356, in addition to across the entirety of the flow straightening portion 380.

As mentioned above, the seat rings 20, 100, 200, 300 and flow separators 46, 146, 246, 346 of the present disclosure serve to disrupt turbulence and promote uniform fluid flow in the gallery 30 of a valve body 12. The flow separators 46, 146, 246, 346 are disposed precisely where the fluid profile in the valve body 12 is distorted, turbulent, or otherwise non-uniform. This results in reduced variations in pressure at the inlet 22 and outlet 26 of the valve body 12 and a more stable Δp.

Figure 9A:
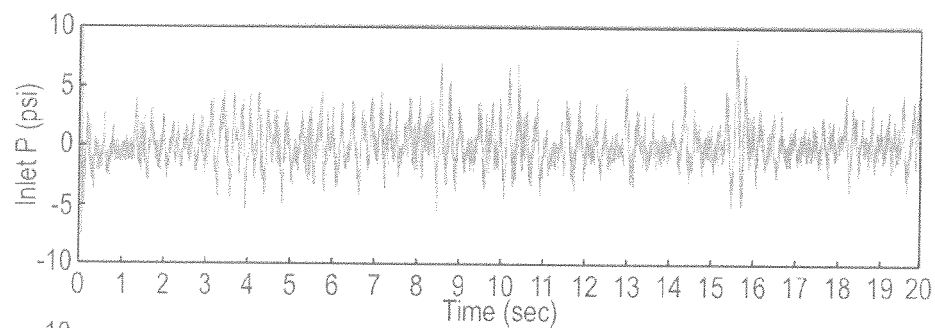
FIGS. 9A and 9B are graphs illustrating fluctuations in inlet and outlet pressures, respectively, of a conventional fluid flow control device.
Figure 9B:
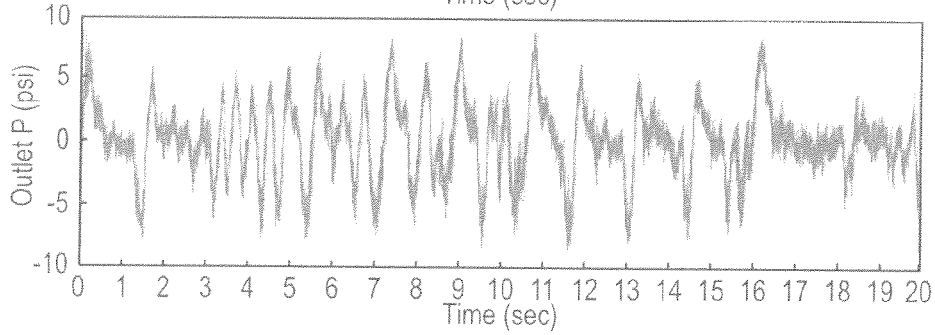
Figure 10A:
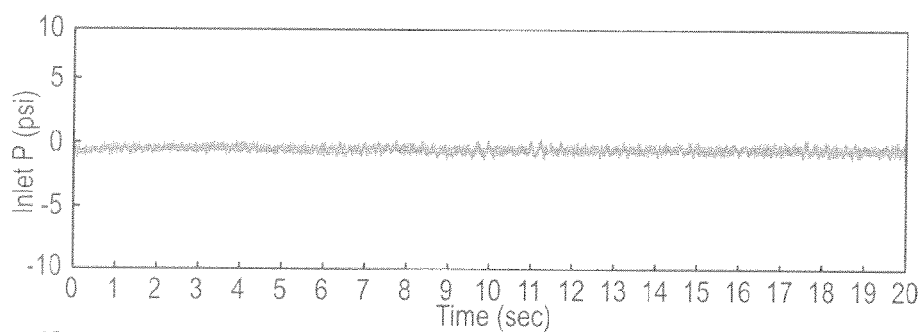
FIGS. 10A and 10B are graphs illustrating fluctuations in inlet and outlet pressures, respectively, of a fluid flow control device constructed in accordance with the principles of the present disclosure.
Figure 10B:
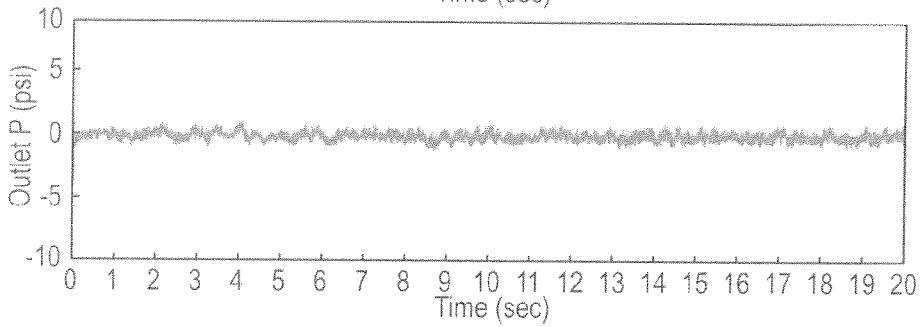

FIGS. 9A and 9B illustrate a typical pressure variance profile at the inlet and outlet, respectively, for the control deice 10 depicted in FIG. 1 using a seat ring that includes only the annular body 44, without the flow separator 46 installed. As can be seen, during operation, the pressures at the inlet can fluctuate by as much as 10 psi and more, while the pressure at the outlet can fluctuate as much as 20 psi. In contrast to FIGS. 9A and 9B. FIGS. 10A and 10B illustrate a pressure variance profile at the inlet and outlet, respectively, for the control device 10 depicted in FIG. 1 with the seat ring 300 depicted in FIG. 8, including the flow separator 346. As can be seen, the pressure fluctuations at the inlet and outlet using the seat ring 300 are greatly reduced in FIGS. 10A and 10B relative to FIGS. 9A and 9B. In FIGS. 10A and 10B, the pressure fluctuations are close to only 2-3 psi.

Figure 11:
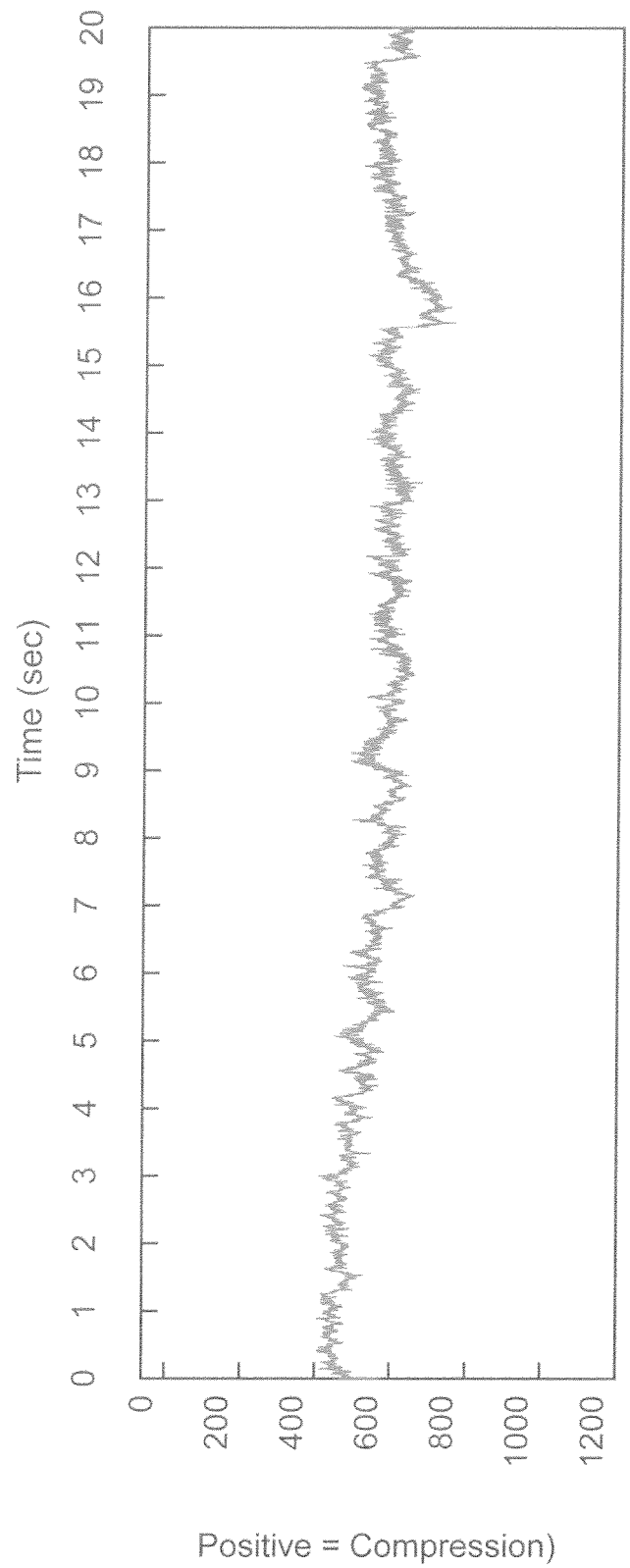
FIG. 11 is a graph illustrating fluctuations in force applied to a control element of a conventional fluid flow control device.
Figure 12:
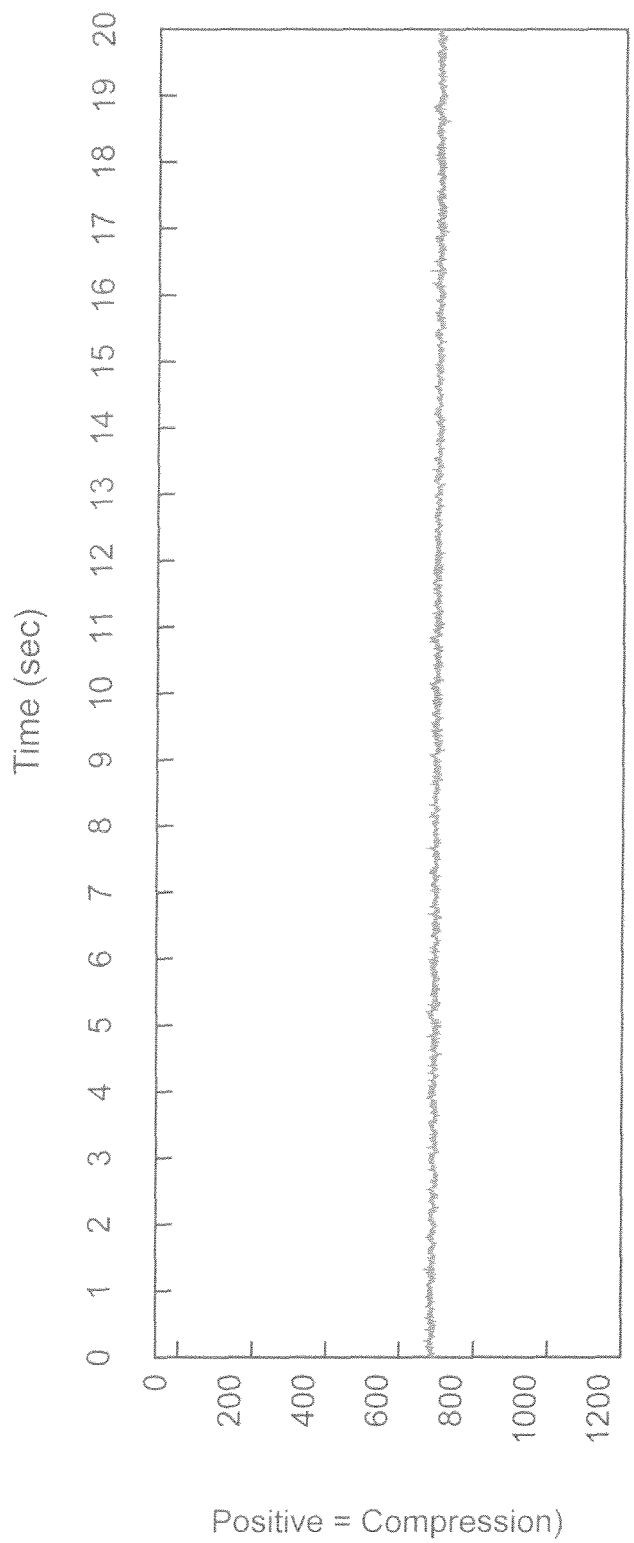
FIG. 12 is a graph illustrating fluctuations in force applied to a control element of a fluid flow control device constructed in accordance with the principles of the present disclosure.

In addition to reducing inlet and outlet pressure fluctuations, the seat rings of the present disclosure effectively reduce fluctuations in the force applied to the control clement 16. FIG. 11 illustrates a typical force variance profile on the control element 16 for the control device 10 depicted in FIG. 1 using a seat ring that includes only the annular body 44, without the 11 separator 46 installed. As can be seen, the force on the control clement 16 can fluctuate by as much as approximately 200 lbf. In contrast, FIG. 12 illustrates a force variance profile on the control element 16 of the control device 10 depicted in FIG. 1 equipped with the seat ring 300 of FIG. 8. As can be seen, the force fluctuations on the control element 16 using the seat ring 300 are greatly reduced in FIG. 12 relative to FIG. 11. In FIG. 12, the force on the control element 16 only fluctuates by approximately 20 lbf.

From the foregoing, it can be seen that the seat rings and flow separators of the present disclosure advantageously reduce fluctuations in Δp and fluctuations in the force applied to the control clement 16 of the control valve 10. As such, any one of the flow separators 46, 146, 246, 346 described herein may also he considered means for reducing pressure fluctuations and/or means for reducing force fluctuations. Reducing pressure fluctuations advantageously promotes uniform fluid flow, which can be more efficient and desirable to non-uniform fluid flow. Reducing the magnitude of force fluctuations applied to the control element advantageously enables the use of smaller actuators, which are less expensive and more light weight. That is, in order to combat large fluctuations in force applied to the control element with a pneumatic actuator, for example, the actuator must he made very stiff, which requires a very large actuator. The present disclosure, by reducing the force fluctuations, therefore enables the use of a smaller pneumatic actuator, which saves money and labor.

While the foregoing disclosure provides various examples of fluid flow control devices, seat rings, and/or flow separators, each having slightly different features, the disclosure is not limited to the specific examples disclosed. Rather, any one or more features of any one or more of the examples can be commingled, interchanged, or otherwise combined to arrive at still yet other examples not expressly disclosed. The disclosure of one feature in one example does not preclude the incorporation of that feature in other examples, but rather, it expressly provides that such a feature can be implemented into any other example.

What is claimed:

1. A seat ring for a control valve having a valve body, a valve cage, and a control member disposed within the valve body for controlling the flow of fluid through the valve body, the valve body defining an inlet, an outlet, a gallery, and a flow path extending from the inlet to the outlet via the gallery, and the control member comprising a stem and a valve plug coupled to the stem, the seat ring comprising:

an annular body adapted to be disposed in the gallery of the valve body, the annular body including a retaining portion and an interior sidewall, the retaining portion for being fixed to the valve body, the retaining portion adapted to be directly contacted by the valve cage to assist with maintaining the annular body in the gallery of the valve body, the interior sidewall defining a port for accommodating fluid flow through the gallery, and the interior sidewall defining a seating surface, the seating surface adapted to be directly contacted by the valve plug when the control member is in a closed position; and a flow separator disposed within at least a portion of the port of the annular body, the flow separator including a flow straightening portion defining a plurality of separate passageways, each of the plurality of separate passageways having a hydraulic diameter and a length that is larger than the hydraulic diameter, thereby separating the flow of fluid through the port into a plurality of separate flow paths to interrupt turbulence in the port.

2. The seat ring of claim 1, wherein the plurality of separate passageways are parallel to each other.

3. The seat ring of claim 1, wherein each of the separate passageways is a straight passageway.

4. The seat ring of claim 1, wherein the plurality of separate passageways share a common hydraulic diameter.

5. The seat ring of claim 1, wherein each of the separate passageways includes either a square cross-section or a circular cross-section.

6. The seat ring of claim 1, wherein a ratio of the length of each separate passageway to the hydraulic diameter is in the range of approximately 1.16 to approximately 10.

7. The seat ring of claim 1, wherein a ratio of the length of each separate passageway to the hydraulic diameter is in the range of approximately 3 to approximately 6.

8. The seat ring of claim 1, wherein a ratio of the length of each separate passageway to the hydraulic diameter is approximately 4.75.

9. The seat ring of claim 1, wherein the hydraulic diameter of each of the separate passageways is in a range of approximately ½ inch to 2 inches and the length of each of the separate passageways is in a range of approximately 3 inches to approximately 6 inches.

10. The seat ring of claim 1, wherein the flow straightening portion of the flow separator comprises a first plurality of parallel slats and a second plurality of parallel slats extending transverse to and interconnected with the first plurality of parallel slats to define the plurality of separate passageways.

11. The seat ring of claim 1, wherein the flow straightening portion of the flow separator includes a plurality of parallel tubes fixed in a bundle.

12. The seat ring of claim 1, wherein the plurality of separate passageways are uniformly distributed across the entirety of the flow straightening portion.

13. The seat ring of claim 1, wherein the flow separator further comprises a plurality of foot portions extending radially outward from the flow straightening portion, each of the foot portions fixed to an axial end surface of the annular body.

14. The seat ring of claim 1, wherein the flow straightening portion has a cross-sectional shape that corresponds with a cross-sectional shape of the port.

15. A fluid flow control device, comprising:

a valve body defining an inlet orifice, an outlet orifice, and a gallery disposed between the inlet orifice and the outlet orifice, the inlet and the outlet orifices extending along a common first axis, the gallery extending along a second axis that is transverse to the first axis; and a control member disposed within the gallery of the valve body and displaceable along the second axis for controlling the flow of fluid through the valve body, the control member comprising a stem and a valve plug coupled to the stem;

a seat ring fixedly disposed within the gallery of the valve body, the seat ring comprising an annular body and a flow separator, the annular body including a retaining portion and an interior sidewall, the retaining portion fixedly attached to the valve body and the interior sidewall defining a port for accommodating fluid flow through the gallery, the flow separator disposed within at least a portion of the port of the annular body, the flow separator including a flow straightening portion defining a plurality of separate passageways, each of the plurality of separate passageways having a hydraulic diameter and a length that is larger than the hydraulic diameter, thereby separating the flow of fluid through the port into a plurality of separate flow paths to interrupt turbulence in the port and the gallery, wherein the control member is displaceable along the second axis between a closed position in which the valve plug directly contacts a seating surface defined by the interior sidewall and an open position in which the valve plug is spaced away from the seating surface to enable fluid flow.

16. The fluid flow control device of claim 15, wherein the valve body further comprises an inlet passageway extending between the inlet orifice and the gallery, an outlet passageway extending between the outlet passageway and the gallery, wherein a portion of the inlet passageway that is disposed adjacent to the gallery extends along a transition axis that is disposed at an angle relative to the second axis of the gallery, the angle being in a range of approximately 30 degrees to approximately 90 degrees.

17. The fluid flow control device of claim 16, wherein the angle is in a range of approximately 45 degrees to approximately 90 degrees.

18. The fluid flow control device of claim 16, wherein the angle is approximately 45 degrees.

19. The fluid flow control device claim 15, wherein the valve body comprises a face-to-face dimension and the seat ring includes a port diameter, the face-to-face dimension of the valve body being defined as a distance between an inlet plane that is occupied by the inlet orifice and an outlet plane that is occupied by the outlet orifice, the port diameter of the seat ring being defined as a diameter of the port in the seat ring, wherein a ratio of the face-to-face dimension to the port diameter is in a range of approximately 1.43 to approximately 10.

20. The fluid flow control device of claim 19, wherein a ratio of the face-to-face dimension to the port diameter is in a range of approximately 2.5 to approximately 3.

21. The fluid flow control device of claim 15, wherein the plurality of separate passageways in the flow separator are parallel to each other.

22. The fluid flow control device of claim 15, wherein each of the separate passageways in the flow separator is a straight passageway.

23. The fluid flow control device of claim 15, wherein the plurality of separate passageways in the flow separator share a common hydraulic diameter.

24. The fluid flow control device of claim 15, wherein each of the separate passageways in the flow separator includes either a square cross-section or a circular cross-section.

25. The fluid flow control device of claim 15, wherein a ratio of the length of each separate passageway to the hydraulic diameter is in the range of approximately 1.16 to approximately 10.

26. The fluid flow control device of claim 15, wherein a ratio of the length of each separate passageway to the hydraulic diameter is in the range of approximately 3 to approximately 6.

27. The fluid flow control device of claim 15, wherein a ratio of the length of each separate passageway to the hydraulic diameter is approximately 4.75.

28. The fluid flow control device of claim 15, wherein the hydraulic diameter of each of the separate passageways in the flow separator is in a range of approximately ½ inch to 2 inches and the length of each of the separate passageways in the flow separator is in a range of approximately 3 inches to approximately 6 inches.

29. The fluid flow control device of claim 15, wherein the flow straightening portion of the flow separator comprises a first plurality of parallel slats and a second plurality of parallel slats extending transverse to and interconnected with the first plurality of parallel slats to define the plurality of separate passageways.

30. The fluid flow control device of claim 15, wherein the flow straightening portion of the flow separator includes a plurality of parallel tubes fixed in a bundle.

31. The fluid flow control device of claim 15, wherein the plurality of separate passageways in the flow separator are uniformly distributed across the entirety of the flow straightening portion.

32. The fluid flow control device of claim 15, wherein the flow separator further comprises a plurality of foot portions extending radially outward from the flow straightening portion, each of the foot portions fixed to an axial end surface of the annular body.

33. The fluid flow control device of claim 15, wherein the flow straightening portion of the flow separator of the seat ring has a cross-sectional shape that corresponds with a cross-sectional shape of the port of the seat ring.

34. A fluid flow control device, comprising:
a valve body defining an inlet orifice, an outlet orifice, and a gallery disposed between the inlet orifice and the outlet orifice, the inlet and the outlet orifices extending along a common first axis, the gallery extending along a second axis that is transverse to the first axis; and
a control member disposed within the gallery of the valve body and displaceable along the second axis for controlling the flow of fluid through the valve body, the control member comprising a stem and a valve plug coupled to the stem;
a seat ring fixedly disposed within the gallery of the valve body, the seat ring comprising an annular body and a means for reducing pressure fluctuations, the annular body including a retaining portion and an interior sidewall, the retaining portion fixedly attached to the valve body and the interior sidewall defining a port for accommodating fluid flow through the gallery, the means for reducing pressure fluctuations fixed within the port of the annular body for reducing fluctuations in an inlet pressure at the inlet orifice of the valve body and an outlet pressure at the outlet orifice of the valve body,
wherein the control member is displaceable along the second axis between a closed position in which the valve plug directly contacts a seating surface defined by the interior sidewall and an open position in which the valve plug is spaced away from the seating surface to enable fluid flow.

35. A fluid flow control device, comprising:
a valve body defining an inlet orifice, an outlet orifice, and a gallery disposed between the inlet orifice and the outlet orifice, the inlet and the outlet orifices extending along a common first axis, the gallery extending along a second axis that is transverse to the first axis; and
a control member disposed within the gallery of the valve body and displaceable along the second axis for controlling the flow of fluid through the valve body, the control member comprising a stem and a valve plug coupled to the stem;
a seat ring fixedly disposed within the gallery of the valve body, the seat ring comprising an annular body and a means for reducing force fluctuations, the annular body including a retaining portion and an interior sidewall, the retaining portion fixedly attached to the valve body and the interior sidewall defining a port for accommodating fluid flow through the gallery, the means for reducing force fluctuations fixed within the port of the annular body for reducing fluctuations in a force applied to the control element,
wherein the control member is displaceable along the second axis between a closed position in which the valve plug directly contacts a seating surface defined by the interior sidewall and an open position in which the valve plug is spaced away from the seating surface to enable fluid flow.

36. A method of manufacturing a seat ring for a fluid flow control device, the seat ring including a ring-shaped body and a flow separator, the method comprising:
cutting a first plurality of flat pieces of a material into a first plurality of elongated slats having a first plurality of slits extending downward from an upper edge thereof;
cutting a second plurality of flat pieces of a material into a second plurality of elongated slats having a second plurality of slits extending upward from a bottom edge thereof;
interconnecting the first plurality of elongated slats with the second plurality of elongated slats by aligning each of the first plurality of slits with a corresponding one of the second plurality of slits and sliding the slats together such that portions of the first plurality of slats are received within the second plurality of slits of the second plurality of elongated slats and portions of the second plurality of slats are received within the first plurality of slits of the first plurality of elongated slats;
fixing the first and second pluralities of slats together at locations adjacent to at least some of the first and second pluralities of slits to create an intermediate flow separator;
machining the intermediate flow separator into a desired shape to correspond with a cross-sectional shape of a port of the ring-shaped body of the seat ring for the fluid flow control device to create a final flow separator;
inserting the final flow separator into the port of the ring-shaped body; and
fixing the final flow separator to the ring-shaped body.

37. The method of claim 36, wherein fixing the first and second pluralities of slats together comprises at least one of welding or brazing.

38. The method of claim 36, wherein fixing the final flow separator to the ring-shaped body comprises at least one of welding or brazing.

39. The method of claim 36, wherein fixing the final flow separator to the ring-shaped body comprises fixing the final flow separator to an interior sidewall of the ring-shaped body.

40. The method of claim 36 wherein cutting the first and second pluralities of flat pieces into the first and second pluralities of elongated slats further comprises cutting at least some of the flat pieces to include foot flanges extending from opposite ends thereof.

41. The method of claim 40, wherein fixing the final flow separator to the ring-shaped body comprising fixing the foot flanges of the first and second pluralities of elongated slats to an axial end surface of the ring-shaped body.

42. The method of claim 41, wherein fixing the foot flanges of the first and second pluralities of elongated slats to an axial end surface of the ring-shaped body comprises at least one of welding or brazing.

43. A method of retro-fitting a fluid flow control device with a flow separator, the fluid flow control device comprising a valve body, a control element, and a seat ring, the valve body defining an inlet, an outlet, and a gallery disposed between the inlet and the outlet, the control element movably disposed in the gallery between a closed position and at least one open position, and the seat ring fixed in the gallery for being sealingly engaged by the control element when the control element is in the closed position, the method comprising:

removing the control element from the gallery of the valve body, thereby exposing a gallery opening in the valve body;

removing the seat ring from the valve body, the seat ring comprising an annular body including an interior sidewall defining a port for accommodating fluid flow through the gallery;

positioning a flow separator into the port of the seat ring, the flow separator including a flow straightening portion and at least one foot portion, the flow straightening portion defining a plurality of separate passageways, the at least one foot portion extending radially outward from the flow straightening portion;

fixing the at least one foot portion to an axial end surface of the annular body, thereby fixing the flow separator to the annular body; and inserting and securing the seat ring, including the annular body and the flow separator, in the gallery of the valve body such that the plurality of separate passageways are adapted to separate the flow of fluid through the port into a plurality of separate flow paths.

44. The method of claim 43, wherein fixing the at least one foot portion of the flow separator to the annular body of the seat ring comprises welding or brazing the at least one foot portion to the annular body.

45. The fluid flow control device of claim 15, further comprising a cage disposed within the gallery, the cage having a bottom end that directly contacts the retaining portion of the annular body to assist with maintaining the seat ring within the gallery of the valve body.

* * * * *

UNITED STATES PATENT AND TRADEMARK OFFICE
CERTIFICATE OF CORRECTION

PATENT NO. : 9,097,364 B2
APPLICATION NO. : 13/431697
DATED : August 4, 2015
INVENTOR(S) : Michel K. Lovell It is certified that error appears in the above-identified patent and that said Letters Patent is hereby corrected as shown below:

On the Title Page:

At item (57), under "ABSTRACT," line 3, "to he" should be -- to be --.

In the Specification:

At Column 1, line 7, "directed" should be -- directed to --.

At Column 1, line 37, "internal" should be -- internal trim --.

At Column 1, line 39, "How" should be -- flow --.

At Column 1, line 48, "or" should be -- of --.

At Column 1, line 49, "having" should be -- having a --.

At Column 1, line 50, "inlet" should be -- inlet to --.

At Column 1, line 53, "or" should be -- of --.

At Column 1, line 58, "or the port or" should be -- of the port of --.

At Column 1, line 59, "or" should be -- of --.

At Column 1, line 62, "large" should be -- larger --.

At Column 1, line 64, "or separate" should be -- of separate --.

At Column 2, line 16, "or" should be -- of --.

At Column 2, line 19, "form" should be -- diameter to form --.

At Column 2, line 20, "a" should be -- into a --.

Signed and Sealed this
Twelfth Day of April, 2016

Michelle K. Lee
*Director of the United States Patent and Trademark Office*

CERTIFICATE OF CORRECTION (continued)
U.S. Pat. No. 9,097,364 B2

At Column 2, line 25, "between" should be -- between the --.

At Column 2, line 26, "the orifices" should be -- the outlet orifices --.

At Column 2, line 48, "transverse" should be -- transverse to --.

At Column 3, line 9, "or" should be -- of --.

At Column 3, line 16, "or" should be -- of --.

At Column 3, line 20, "separate the" should be -- separator to the --.

At Column 4, line 49, "vertically the" should be -- vertically within the --.

At Column 4, line 60, "example," should be -- example; --.

At Column 5, line 8, "angle. alpha." should be -- angle α --.

At Column 6, line 20, "adjacent" should be -- adjacent to --.

At Column 6, line 30, "or clarity." should be -- of clarity. --.

At Column 6, line 31, "or flow" should be -- of flow --.

At Column 7, line 36, "fluid" should be -- fluid flow --.

At Column 7, line 54, "a" should be -- an --.

At Column 7, line 65, "ratio" should be -- a ratio --.

At Column 8, lines 43-44, "exterior sidewalls 156" should be -- exterior sidewalls 157 --.

At Column 9, line 7, "or" should be -- of --.

At Column 9, line 11, "or" should be -- of --.

At Column 9, line 27, "or" should be -- of --.

At Column 9, line 56, "a" should be -- of --.

At Column 10, line 12, "How" should be -- flow --.

At Column 10, line 18, "characteristics" should be -- characteristics of --.

At Column 10, line 30, "he" should be -- be --.

At Column 11, line 3, "control element 18" should be -- control element 16 --.

At Column 11, lines 5-6, "flow straightening portion 200" should be -- flow straightening portion 280 --.

At Column 11, line 60, "deice" should be -- device --.

CERTIFICATE OF CORRECTION (continued)
U.S. Pat. No. 9,097,364 B2

At Column 11, line 65, "9B." should be -- 9B, --.

At Column 12, line 8, "clement" should be -- element --.

At Column 12, line 12, "11" should be -- flow --.

At Column 12, line 13, "clement" should be -- element --.

At Column 12, line 24, "clement" should be -- element --.

At Column 12, line 26, "he" should be -- be --.

At Column 12, line 35, "he" should be -- be --.

In the Claims:

At Column 14, line 32, "device" should be -- device of --.